United States Patent Office 2,776,311
Patented Jan. 1, 1957

2,776,311

DIAMIDO ANILIDO PHOSPHINE OXIDES AND SULFIDES

Arthur J. Erbel, Bay City, and Eugene E. Kenaga, Midland, Mich., assignors to The Dow Chemical Company, Midland, Mich., a corporation of Delaware No Drawing. Application June 16, 1953,
Serial No. 362,140

6 Claims. (Cl. 260—551)

The present invention is concerned with the diamido anilido phosphine oxides and sulfides having the formula

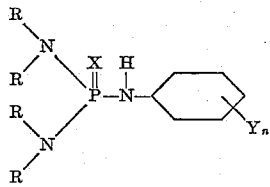

In this and succeeding formulae, X represents a chalkogen, i. e. oxygen or sulfur, each R represents an alkyl radical containing from 1 to 4 carbon atoms, each Y represents halogen or an alkyl radical containing from 1 to 4 carbon atoms and $n$ is an integer from 1 to 5, inclusive. These new compounds are crystalline solids or oily liquids somewhat soluble in many organic solvents and of very low solubility in water. They exert a strong parasiticidal action against such organisms as bacteria, fungi, mites and insects and are adapted to be employed as active toxic constituents of germicidal compositions for the destruction of bacterial and fungal organisms and as toxic constituents of spray and dust compositions for the control of household and agricultural mite and insect pests such as aphids, beetles and worms.

The new compounds may be prepared by reacting an anilido phosphoric dichloride of the formula

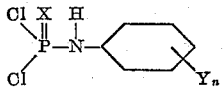

with at least one and no more than two amines of the formula

to displace the chlorines in the anilido phosphoric dichloride with amido groups. The reaction is carried out in an inert non-polar organic solvent such as toluene, benzene, xylene, diethyl ether, or chlorobenzene and in sufficient excess of the amine reactant to act as acceptor for by-product hydrogen chloride. The reaction takes place smoothly at the temperature of from about 10° to 80° C. and at a rate which varies directly with the temperature employed.

Where it is desired to introduce two identical amido groups into the molecule, one molecular proportion of the anilido phosphoric dichloride is reacted with at least two molecular proportions of the amine in sufficient excess of the amine to act as hydrogen chloride acceptor. In carrying out the reaction, either reactant may be dispersed in the inert organic solvent and added to the other with stirring and under suitable conditions of temperature in the reaction vessel.

Where it is desired that the substituted amido groups differ, one molecular proportion of the anilido phosphoric dichloride is successively reacted with one molecular proportion of each amine in a sufficient excess of each amine reactant to act as hydrogen chloride acceptor. In carrying out the reaction, the anilido phosphoric dichloride may be dispersed in the solvent and the amines successively added portionwise to the solvent mixture with stirring and under suitable conditions of temperature in the reaction vessel.

Upon completion of the reaction, the amine hydrochloride is separated by filtration and the filtrate distilled under reduced pressure to recover reaction solvent. The diamido anilido phosphine oxides are generally crystalline solids and precipitate in the remaining residue as fine crystals and usually thereby form a slurry of crystals. The latter may be separated and purified by recrystallization from various organic solvents. When the desired product does not precipitate as a crystalline solid, the residue may be distilled under reduced pressure at gradually increasing temperatures up to a temperature of about 180° C. to separate low boiling constituents and obtain the desired product as an oily liquid.

In an alternative procedure, the diamido anilido phosphine oxides of the present invention may be prepared by reacting a substituted aniline of the formula

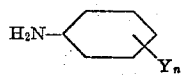

with a diamido phosphoric chloride of the formula

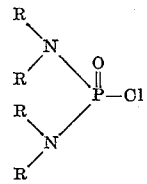

The reaction is carried out in one of the inorganic solvents as mentioned above and in the presence of a sufficient amount of a tertiaryamine such as triethylamine or pyridine to act as acceptor for by-product hydrogen chloride. The reaction takes place smoothly at the temperature range of from about 80° to 180° C. and at a rate which varies directly with the temperature employed. Good results are obtained when employing substantially equimolecular proportions of the reactants.

In carrying out the reaction, the substituted aniline, the diamido phosphoric chloride and the hydrogen chloride acceptor are dispersed in the reaction solvent and the resulting mixture heated for a period of time at a temperature of from about 80° to 180° C. In a convenient method, the reaction is carried out at the boiling temperature of the reaction mixture and under reflux. Upon completion of the reaction, the amine hydrochloride is separated by filtration and the filtrate processed as previously described to separate the desired diamido anilido phosphine oxide.

The following examples illustrate the invention but are not to be construed as limiting.

*Example 1.—Bis(dimethylamido) 4-chloroanilido phosphine oxide*

17 grams (0.1 mole) of bis(dimethylamido) phosphoric chloride (boiling at 82°–84° C. at 2 millimeters pressure), 12.7 grams (0.1 mole) of 4-chloroaniline and 10 grams (0.1 mole) of triethylamine were dispersed in 200 milliliters of toluene and the resulting mixture heated at the boiling temperature and under reflux. The heating was carried out with stirring and over a period of about 72 hours. The crude reaction mixture was then filtered to separate amine hydrochloride and the filtrate thereafter distilled under reduced pressure to recover the toluene solvent. Upon standing, bis(dimethylamido) 4- chloroanilido phosphine oxide precipitated in the residue as fine crystals and thereby formed a slurry of crystals. The latter was thereafter separated by filtration and twice recrystallized from carbon bisulfide to obtain a bis(dimethylamido) 4-chloroanilido phosphine oxide product as a white crystalline solid having a density of 1.6200 at 30° C.

*Example 2.—Bis(dimethylamido) 2,5-dichloroanilido phosphine oxide*

8.5 grams (0.05 mole) of bis(dimethylamido) phosphoric chloride, 8 grams (0.05 mole) of 2,5-dichloroaniline and 5 grams (0.05 mole) of triethylamine were dispersed in 100 milliliters of benzene and the resulting mixture heated at the boiling temperature and under reflux. The heating was carried out with stirring and over a period of about 16 hours. The crude reaction mixture was then filtered to separate triethylamine hydrochloride and the solvent recovered from the filtrate by fractional distillation under reduced pressure. Upon standing, the desired product slowly crystallized in the remaining residue to form a crystalline slurry. The latter was thereafter separated by filtration and twice recrystallized from ethanol to obtain a bis(dimethylamido) 2,5-dichloroanilido phosphine oxide product as a crystalline solid melting at 91°–95° C.

*Example 3.—Bis(dimethylamido) 2,4-dimethylanilido phosphine oxide*

0.1 mole quantities of bis(dimethylamido) phosphoric chloride, 2,4-dimethylaniline and triethylamine were dispersed in 250 milliliters of cyclohexane and the resulting mixture heated for 4 hours at the boiling temperature and under reflux. The reaction mixture was then filtered and the filtrate distilled under reduced pressure to recover the reaction solvent. Upon standing fine crystals precipitated in the residue to form a slurry of crystals. The latter product was thereafter separated by filtration and recrystallized from acetone to obtain a bis(dimethylamide) 2,4-dimethylanilido phosphine oxide product melting at 148°–152°. C.

*Example 4.—Bis(dimethylamido) 2,4,6-tribromanilido phosphine oxide*

0.1 mole quantities of bis(dimethylamido) phosphoric chloride, 2,4,6-tribromaniline and triethylamine were dispersed in 200 milliliters of ortho-dichlorobenzene and the resulting dispersion heated at the boiling temperature for about 16 hours and under reflux. The reaction mixture was then processed in the manner as described in Example 2 to obtain a bis(dimethylamido) 2,4,6-tribromoanilido phosphine oxide product as a crystalline solid melting at 113° to 115° C.

*Example 5.—Bis(diethylamido) 2-ethylanilido phosphine oxide*

0.1 mole quantities of bis(diethylamido) phosphoric chloride (boiling at 105°–110° C. a 1 millimeter pressure), 2-ethylaniline and triethylamine were dispersed in 200 milliliters of ortho-dichlorobenzene and the resulting mixture heated for about 16 hours at the boiling temperature and under reflux. The reaction mixture was then filtered and the filtrate distilled under reduced pressure at gradually increasing temperatures up to a temperature of 105° C. at 0.75 millimeter pressure to separate low boiling constituents and obtain a bis(diethylamido) 2-ethylanilido phosphine oxide product. The latter was a viscous oil having a refractive index $n/D$ of 1.5300 at 25° C.

*Example 6.—Bis(diethylamido) 2,6-dimethylanilido phosphine sulfide*

23.8 grams (0.1 mole) of 2,6-dimethylanilido triophosphoric dichloride and 29.2 grams (0.4 mole) of diethylamine were dispersed in 250 milliliters of diethyl ether and the resulting mixture heated for about one hour at the boiling temperature and under reflux. The reaction mixture was then filtered and the filtrate thereafter distilled under reduced pressure to separate low boiling constituents and obtain a bis(diethylamido) 2,6-dimethylanilido phosphine sulfide product. The latter was a viscous oil having a refractive index $n/D$ of 1.5443 at 25° C.

*Example 7.—N,N-diethyl-N′,N′-dibutyl 4-chloroanilido phosphine sulfide*

14.6 grams (0.2 mole) of diethylamine is dissolved in 50 milliliters of benzene and the resulting solution added portionwise to 26 grams (0.1 mole) of 4-chloroanilido thiophosphoric dichloride dispersed in 50 milliliters of benzene. The latter operation is carried out with stirring and at a temperature of 35° C. Stirring is continued for about one hour at this same temperature, and a mixture containing 25.8 grams (0.2 mole) of dibutylamine in 50 milliliters of benzene, thereafter added portionwise to the reaction mixture at a temperature of 50° C. Following the latter addition, the mixture is stirred at this same temperature for about one hour and thereafter cooled to room temperature and filtered. The filtrate is then distilled under rdeuced pressure at gradually increasing temperatures up to a temperature of 160° C. to separate low boiling constituents and obtain an N,N-diethyl-N′,N′-dibutyl 4-chloroanilido phosphine sulfide product as a residue.

In a similar manner other diamido anilido phosphine oxides and sulfides may be prepared as follows:

N-methyl - N - isopropyl-N′,N′-dibutyldiamido 2,4,5-trichloroanilido phosphine oxide by reacting together 2,4,5-trichloroaniline and N-methyl-N-isopropyl-N′,N′-dibutyldiamidophosphoric chloride.

Bis(dimethylamido) 4-bromo-2-methylanilido phosphine oxide by reacting together 4-bromo-2-methylanilido phosphoric dichloride and dimethylamine.

Bis(dibutylamido) 2-methyl-4-isopropylanilido phosphine sulfide by reacting together 2-methyl-4-isopropylanilido thiophosphoric dichloride and dibtuylamine.

N,N-dimethyl-N′,N′-dibutyldiamido 2,4-dibutylanilido phosphine sulfide by successively reacting 2,4-dibutylanilido thiophosphoric dichloride with dimethylamine and dibutylamine.

Bis(diethylamido) 4-bromo-2-chloroanilido phosphine oxide by reacting together 4-bromo-2-chloroanilido phosphoric dichloride and diethylamine.

The new diamido anilido phosphine oxides and sulfides are adapted to be employed for the control of agricultural and household pests. For such use the products may be dispersed on an inert finely divided solid and employed as dusts. Also, such mixtures may be dispersed in water with the aid of a wetting agent, and the resulting aqueous suspensions employed as sprays. In other procedures, the products may be employed in oils, or in water dispersions with or without the addition of wetting agents. In an operation illustrative of the effectiveness of the new compounds, bis(dimethylamido) 2,4-dimethylanilido phosphine oxide at a concentration of one pound per 100 gallons of spray mixture gave a complete control of bean aphids on nasturtium plants.

The diamido phosphoric chlorides employed as starting materials as previously described may be prepared by reacting phosphorus oxychloride with at least one and no more than two amines of the formula

to displace two of the chlorines in the phosphorus oxychloride with amido groups. The reaction is carried out in an inert organic solvent and in sufficient excess of the amine reactant to act as acceptor for by-product hydrogen chloride. The reaction takes place at the temperature range of from about 0° to 40° C. and at a rate which varies directly with the temperature employed. Where it is desired to introduce two identical amido groups into the molecule, four molecular proportions of the amine are employed with each molecular proportion of the phosphorus oxychloride. When it is desired that the substituting amido groups differ, one molecular proportion of the phosphorus oxychloride is successively reacted portionwise with two molecular proportions of each amine. Upon completion of the reaction, the reaction mixture is filtered and the filtrate fractionally distilled under reduced pressure to separate the desired product.

The substituted anilido phosphoric dichlorides employed as starting materials may be produced by reacting one molecular proportion of a suitable substituted aniline with one molecular proportion of phosphorus oxychloride or phosphorus thiochloride. The reaction is carried out in an inert organic solvent and in the presence of a sufficient amount of a tertiary amine to act as acceptor for by-product hydrogen chloride. The reaction takes place at a temperature of from about 5° to 40° C. Upon completion of the reaction, the mixture is filtered and the filtrate fractionally distilled under reduced pressure to separate the desired product.

We claim:
1. A compound of the formula

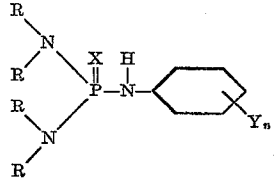

wherein X represents a member of the group consisting of oxygen and sulfur, each R represents an alkyl radical containing from 1 to 4 carbon atoms, inclusive, each Y represents a member of the group consisting of chlorine, bromine and the alkyl radicals containing from 1 to 4 carbon atoms, inclusive and $n$ is an integer from 1 to 5, inclusive.

2. Bis(dimethylamido) 4-chloroanilido phosphine oxide.
3. Bis(dimethylamido) 2,5-dichloroanilido phosphine oxide.
4. Bis(dimethylamido) 2,4-dimethylanilido phosphine oxide.
5. Bis(dimethylamido) 2,4,6-tribromoanilido phosphine oxide.
6. Bis(diethylamido) 2,6-dimethylanilido phosphine sulfide.

References Cited in the file of this patent
UNITED STATES PATENTS

| | | |
|---|---|---|
| 2,146,584 | Lipkin | Feb. 7, 1939 |
| 2,160,841 | Dreyfus | June 6, 1939 |
| 2,596,660 | Dickey | May 13, 1952 |

OTHER REFERENCES

Michaelis: "Liebigs Annalen," vol. 326 (1903), pp. 194–96, 200–01.

Michaelis: Liebigs Annalen 326: 197 (1903).

Kosolapoff: "Organo-phosphorus Compounds," pub. by Wiley and Sons, N. Y., 1950, pp. 300–21.